(12) United States Patent
Burd et al.

(10) Patent No.: US 9,546,910 B2
(45) Date of Patent: Jan. 17, 2017

(54) UNIVERSAL SERIAL BUS (USB) THERMAL IMAGING CAMERA KIT

(71) Applicant: OPGAL OPTRONIC INDUSTRIES LTD., Karmiel (IL)

(72) Inventors: Alexander Burd, Karmiel (IL); Omer Yanai, Shimshit (IL); Ernest Grimberg, Kiriat Bialik (IL); Yossi Cohen, Hosen (IL)

(73) Assignee: OPGAL OPTRONIC INDUSTRIES LTD., Karmiel (IL)

( * ) Notice: Subject to any disclaimer, the term of this patent is extended or adjusted under 35 U.S.C. 154(b) by 0 days.

(21) Appl. No.: 14/764,209

(22) PCT Filed: Dec. 12, 2013

(86) PCT No.: PCT/IL2013/051026
§ 371 (c)(1),
(2) Date: Jul. 29, 2015

(87) PCT Pub. No.: WO2014/118768
PCT Pub. Date: Aug. 7, 2014

(65) Prior Publication Data
US 2015/0362375 A1    Dec. 17, 2015

Related U.S. Application Data

(60) Provisional application No. 61/757,754, filed on Jan. 29, 2013.

(51) Int. Cl.
*G01J 5/22* (2006.01)
*H04N 5/33* (2006.01)
(Continued)

(52) U.S. Cl.
CPC ................ *G01J 5/22* (2013.01); *G01J 5/025* (2013.01); *H04N 5/33* (2013.01); *G01J 2005/0077* (2013.01)

(58) Field of Classification Search
CPC ................ H04N 5/33; G01J 5/025; G01J 5/22
See application file for complete search history.

(56) References Cited

U.S. PATENT DOCUMENTS

| 8,003,941 | B1 | 8/2011 | Heinke et al. |
| 2003/0057371 | A1* | 3/2003 | Wood ........................ G01J 1/02 250/330 |

(Continued)

FOREIGN PATENT DOCUMENTS

DE    10 2010 00845    8/2011

OTHER PUBLICATIONS

International search report of PCT Application No. PCT/IL2013/051026, mailed Apr. 13, 2014.
(Continued)

*Primary Examiner* — Marcus Taningco
(74) *Attorney, Agent, or Firm* — Pearl Cohen Zedek Latzer Baratz LLP

(57) ABSTRACT

A system kit and a method for creating a thermal imaging camera by connecting an infrared radiation capturing device to an external platform are provided herein. The kit may include a front end module which may include an image capturing device comprising a micro bolometer detector; and a universal serial bus (USB) interface connected to the image capturing device. The kit may further include a backend module, comprising data sets which are specific to said micro bolometer detector and computer readable code which is executable by a computer processor located at a physical location other than the front end module, wherein said front end module is configured to obtain raw data from the micro bolometer detector and deliver it over the USB interface to said backend module, wherein said backend module code turns the raw data into thermal imagery and temperature readings.

14 Claims, 3 Drawing Sheets

(51) Int. Cl.
*G01J 5/02* (2006.01)
*G01J 5/00* (2006.01)

(56) References Cited

U.S. PATENT DOCUMENTS

| | | | |
|---|---|---|---|
| 2004/0199303 A1* | 10/2004 | Ohmura | G07B 15/00 |
| | | | 701/5 |
| 2005/0117022 A1* | 6/2005 | Marchant | H04N 1/00281 |
| | | | 348/207.11 |
| 2009/0229779 A1* | 9/2009 | Rundquist | B22D 46/00 |
| | | | 164/4.1 |
| 2012/0078113 A1 | 3/2012 | Whitestone et al. | |
| 2012/0162401 A1* | 6/2012 | Melder | H04N 7/183 |
| | | | 348/65 |
| 2012/0211648 A1* | 8/2012 | Linsacum | H04N 5/33 |
| | | | 250/252.1 |
| 2012/0312976 A1 | 12/2012 | Boulanger et al. | |
| 2012/0314084 A1* | 12/2012 | Lammert | G01J 5/02 |
| | | | 348/164 |
| 2013/0009861 A1* | 1/2013 | Valik | G06F 3/0304 |
| | | | 345/156 |
| 2015/0181136 A1* | 6/2015 | Reinpoldt | H04N 5/33 |
| | | | 348/164 |

OTHER PUBLICATIONS

Anonymous: "USB—Wikipedia, the free encyclopedia", Dec. 30, 2012, https://en.wikipedia.org/w/index.php?title=USB&oldid=530464826.

Extended European Search Report of EP Application No. 13873659.0, mailed on Aug. 31, 2016.

\* cited by examiner

UNIVERSAL SERIAL BUS (USB) THERMAL IMAGING CAMERA KIT

CROSS-REFERENCE TO RELATED APPLICATIONS

This application is a National Phase Application of PCT International Application No. PCT/IL2013/051026, International Filing Date Dec. 12, 2013, entitled: "UNIVERSAL SERIAL BUS (USB) THERMAL IMAGING CAMERA KIT", published on Aug. 7, 2014 as International Patent Application Publication No. WO 2014/118768, claiming priority of U.S. Patent Application No. 61/757,754, filed Jan. 29, 2013, both of which are incorporated herein by reference in their entireties.

TECHNICAL FIELD

The present invention relates to the field of thermal imaging cameras using microbolometer detectors, and more particularly, to a kit enabling using same on an off the shelf platform.

BACKGROUND

Prior to setting forth a short discussion of the related art, it may be helpful to set forth definitions of certain terms that will be used hereinafter.

The term "capturing device" as used herein, is defined as any hardware combination of optics and sensor that is configured to produce electrical signals representative of a scene in a pixel array format. Specifically, a capturing device as discussed herein, does not include any image processing capability implemented therein beyond converting the raw data a data format appropriate for conveying.

The term "microbolometer detector" as used herein, relates to a detector which includes an array of pixels, sealed in a vacuum package.

Infrared radiation with wavelengths typically between 7.5-14 μm strikes the detector material, heating it, and thus changing its electrical resistance. This resistance change is measured and processed into temperatures which can be used to create an image. Unlike other types of infrared detecting equipment, microbolometers do not require cooling Many thermal imaging cameras make use of microbolometer detectors. Microbolometer detectors suffer from inherent technological issues which make them difficult to work with. When trying to transform the microbolometer readings into good image quality, the raw data captured from the detector has to be corrected with corrections algorithms and correction data sets. Typical corrections are non-uniformity correction (NUC), bad pixel replacement (BPR) and the like. These corrections are specific to each individual detector, and need to be prepared in a special calibration environment, as it requires special tooling and knowhow (Oven, Blackbody, software and the like). More often, corrections are required not only per specific detector, but may also be needed for a specific combination of detector and lens.

Currently available thermal imaging cameras are comprised of a lens, a detector and electronics. The electronic circuitry which is required for capturing and processing the raw IR data and turning it into a video signal is often called IR Engine or IR core. IR engines include a microbolometer detector which is mounted onto a PCB board integrated with additional appropriate circuitry needed for operating, controlling, powering, and reading the detector. Since currently available detectors provide raw data using a parallel electrical interface, either digital or analog the IR engine includes some computing platform, such as FPGA, ASIC, DSP, CPU, and some form of memory in order to be able to perform the above mentioned corrections, as well as other signal and image processing tasks. The fast development of global consumer electronics market brought the availability of strong processing power to the hands of millions of users. Such processors can well replace the processing functions of an IR Engine.

Another challenge for making thermal imaging available for consumers is the power requirements of a microbolometer based thermal imaging device. Due to its way of operation typical IR engine consume 0.6 W or above. Today's consumer electronics are often powered by low power batteries, as for example mobile cellphones, smartphones, tablets, etc. Adding thermal imaging capabilities to a mobile device as an add-on is therefore a challenging task.

SUMMARY

Embodiments of the present invention address the challenge of interfacing a power hungry micro bolometer infrared capturing front-end (FE) device with an external platform by using the USB (and specifically USB On The Go) interface which provides a way to connect a thermal imaging device to a mobile device as long as the imaging device draws less than 500 mW.

According to one aspect, a system for creating a thermal imaging camera by connecting an infrared radiation capturing device to an external platform is provided herein. The system may include: a micro bolometer based capturing front-end (FE) device; and a universal serial bus (USB) interface connected to the FE, wherein the USB interface is configured to deliver both data from the FE and power to the FE, wherein the delivered data is only processed outside the system on an external platform connected to the USB interface. The external platform transforms the raw-data into thermal imaging video and images by using specialty algorithms and a unique correction data set which is specific to the individual microbolometer detector in use.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings.

DETAILED DESCRIPTION

Figure 1:
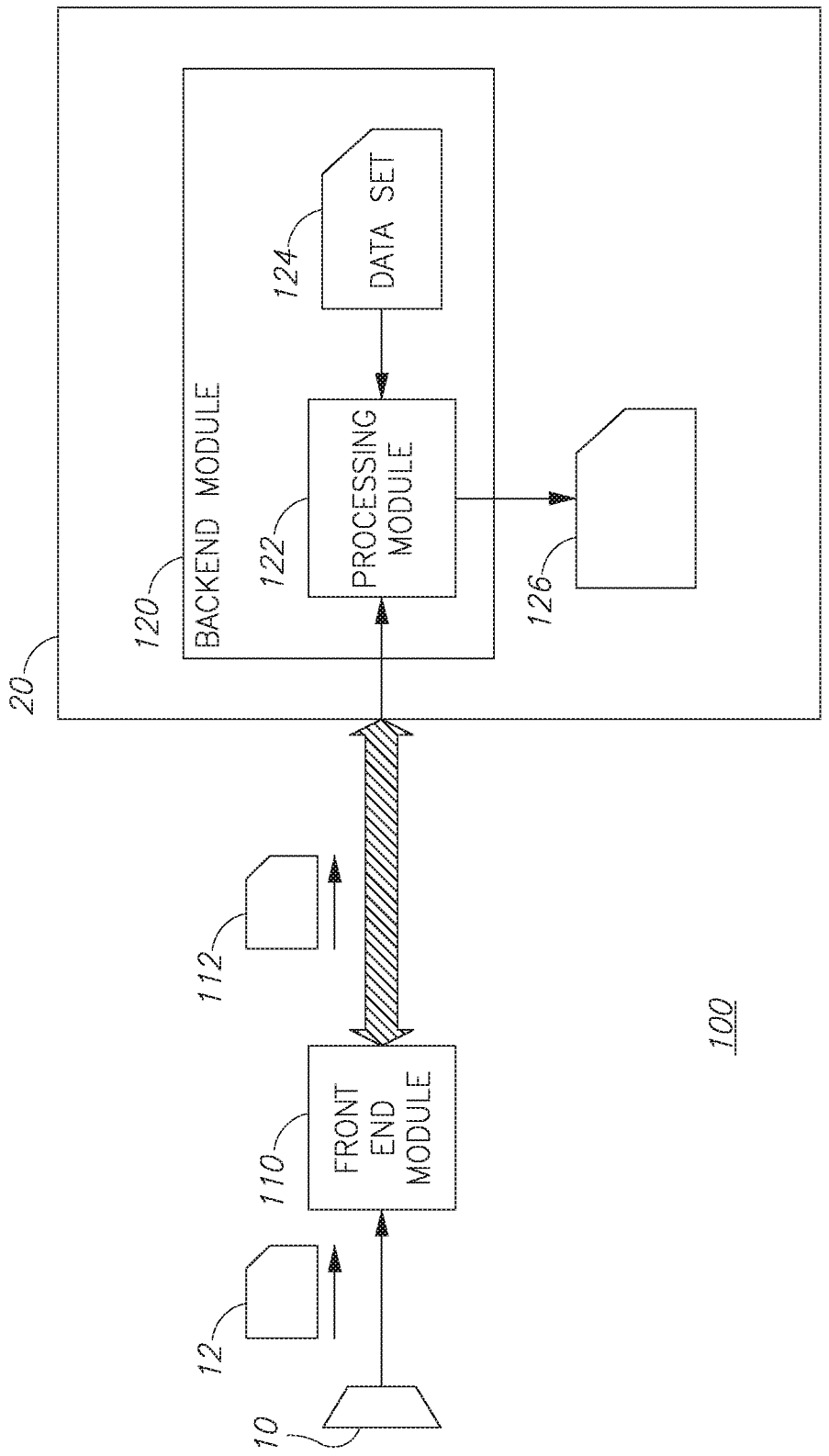
FIG. 1 is a high level schematic block diagram of a system according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram of a system 100 according to some embodiments of the invention. System 100 may include a front end module 110 which includes an image capturing device 10 which includes a micro bolometer detector. Front end module 110 may further include (or associated with) a universal serial bus (USB) interface 130 coupled to image capturing device 10. System 100 may further include a backend module 120 which includes data sets 124 which are specific to the micro bolometer detector and computer readable code such as processing module 122 which is executable by a computer processor located at a physical location other than the front end module.

In operation, front end module 110 may be configured to obtain raw data 12 from the micro bolometer detector and deliver it as USB serialized data 112 over USB interface 130 to backend module 120.

According to some embodiments of the present invention, backend module 120 is configured to process the raw data 12 from the micro bolometer detector delivered in USB serialized format 112 using the data sets 124 and the computer readable code 122, to yield processed data 126. According to some embodiments of the present invention, the processed data 126 comprise thermal imagery data. Processed data 126 may be in the form of still or video imagery but can also relate to any parameters extracted from the raw data without generating first video or still images.

According to some embodiments, computer readable code 122 may include an API (Application Programming Interface) that will enable software developers to develop code for the external platform 20 that will utilize processed data 126.

According to some embodiments of the present invention, data sets 124 may include correction datasets, usable for correcting the raw data obtained from the microbolometer detector, wherein the correction datasets is based on a production profile of said microbolometer detector. More specifically, the production profile comprises data relating to at least one of: bad pixels, production deformations, and pixel level variations of said microbolometer detector.

Figure 2:
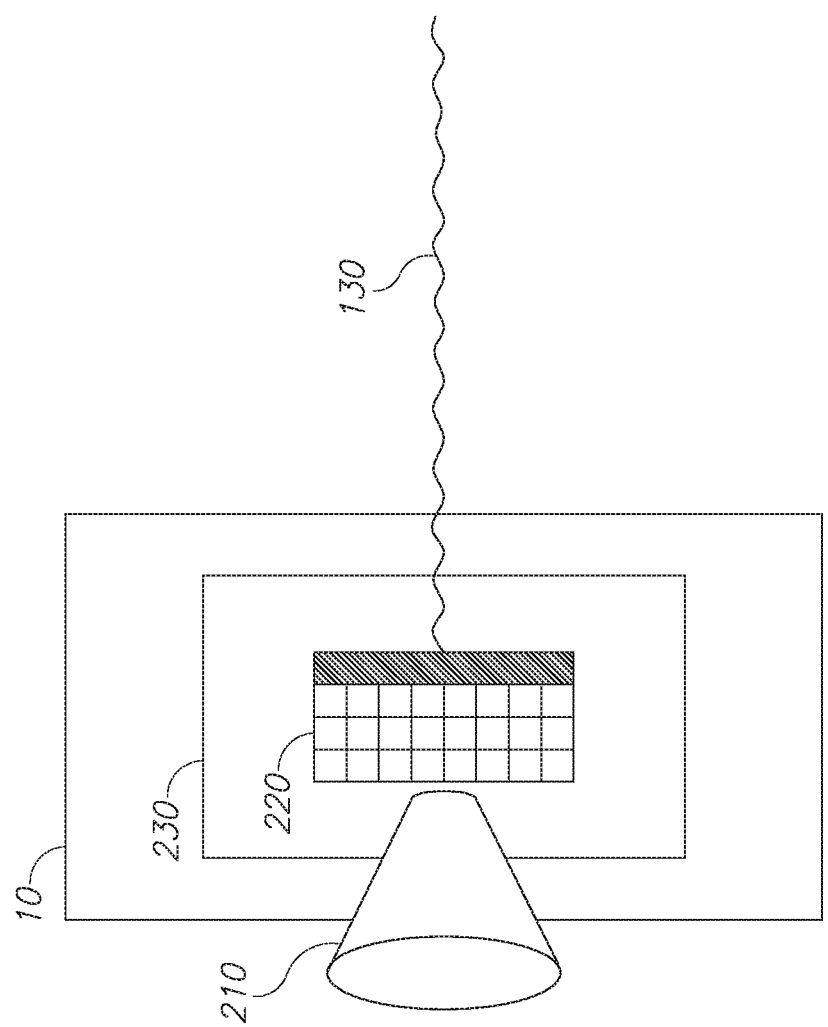
FIG. 2 is a high level schematic block diagram illustrating another aspect of the system according to some embodiments of the invention.

FIG. 2 is a high level schematic block diagram illustrating another aspect of front end module 110 according to some embodiments of the invention. Front end module 110 may include microbolometer detector 220 which is implemented in a form of a photo-sensitive pixel array which is optically coupled to optics 210 and electrically coupled to an Electronic interface 230 (e.g card) which is in communication with USB interface 130.

Figure 3:
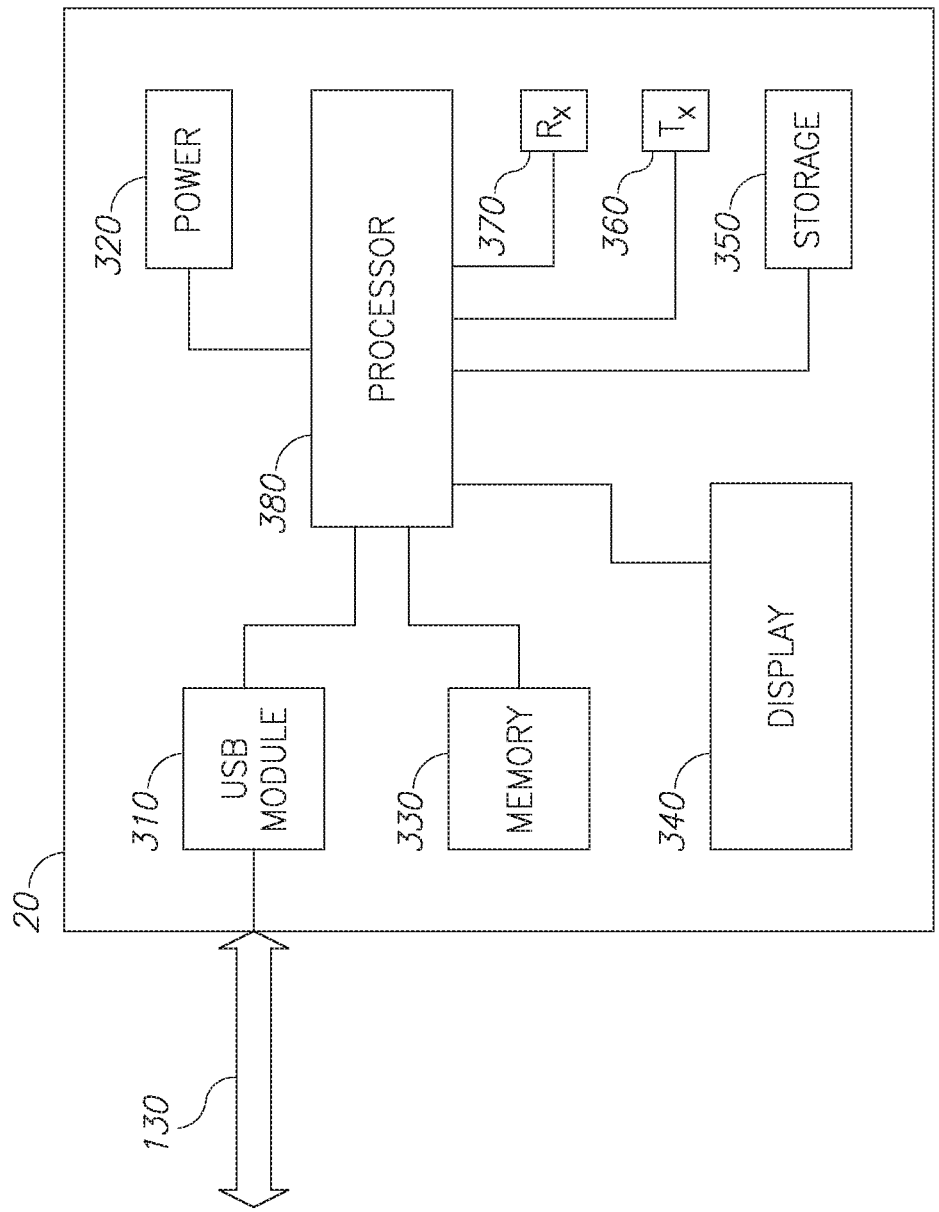
FIG. 3 is a high level schematic block diagram illustrating yet another aspect of the system according to some embodiments of the invention.

FIG. 3 is a high level schematic block diagram illustrating yet another aspect of the system according to some embodiments of the invention. An external platform 20 (being external in the sense that it is external to the microbolometer detector and is located in a different physical location) may include a processor 380 and memory 330 onto which back end module 120 may be loaded. USB port 310 connected to processor 370 may communicate with USB interface 130.

Processor 380 may be further connected to transmitter 360, receiver 370, storage 350, power supply 320, and display 340. In operation, backend module may utilize any of the aforementioned components as resources for processing the raw data obtained from the microbolometer detector. By doing so, a user may enjoy the functionalities and computing power of the external platform with a very lean architecture of the aforementioned front end module 110 and back end module 120.

According to some embodiments of the present invention, front end module 110 is further configured to receive a power supply from a power source 320 via said USB interface 130.

According to some embodiments of the present invention, the power source 320 is located within a platform 20 to which the processor 380 is coupled. Alternatively, the power source is located outside a platform to which the processor is coupled.

According to some embodiments of the present invention, the backend module 120 may further include a (standard development kit) SDK software module configured to enable adding processing and control operations applicable to the microbolometer detector. The invention embodied in the kit formation may be sold as "USB thermal imaging KIT". Advantageously, the USB micro bolometer thermal imaging kit will overcome the current difficulty of using thermal imaging by non-technical users/consumers/software developers. The Kit will enable users of everyday consumer electronics to easily "plug and play" a thermal camera to their existing computing devices. It will also allow software application developers to easily develop advanced thermal imaging applications without the need to understand the complexities of an Infrared detector.

The kit will take advantage of the existing USB (Universal Serial Bus) standards, and in particular the ability for two electrical devices (e.g. a "host" computer and a camera) to be connected, thus enabling power feed and communication exchange between "host" and camera. The thermal kit Front End device consume very low power, and is the only available IR that will require no external power feed other than the ones provided by the consumer device thru the standard USB connector (USB standard calls for <0.5 Watt).

Unlike most currently available thermal cameras, the front end will have no shutter mechanism (Shutter is frequently used to allow periodic non uniformity correction (NUC) operations in the field). In order to simplify front end module 110, thus reducing its power consumption, almost all computational tasks may be carried out at the back end or by the external platform. The kit will eliminate the need for complicated preparations and correction as it include the required magnetic data, software code, documentation and software tools that will allow the user to easily install and operate the USB thermal imager.

Additional thermal Imaging Applications (Apps) and development tools (SDK) will also be available for sell.

Advantageously, front end module is a very low power device which includes a micro bolometer thermal imaging detector. Front end module 110 is a standalone USB device, it is powered by a USB power feed, and is providing raw video data via a standard USB serial interface. The front end will include the following functionality: Since power is supplied by the BE thru the USB connection, the front end will regulate, prepare and feed the micro bolometer detector (power supply needs to be very well regulated and clean of interferences in order to get good image quality).

The front end will provide clock and synchronization signals to the detector. Front end module 110 will control the detector 220 operation. Front end module 110 will read temperature measurements and other parameters that are needed for optimal calculation by the BE. Front end will read the data from the detector. The data could be either digital or analog. In case the detector output is analog, the front end will sample and convert the data to digital. Front end will packetize and serialize the data from the detector and any other information needed, and will prepare the data into a format that is supported by the USB standard.

It is important to note that front end could be materialized either by mounting a standalone microbolometer on a PCB with some additional relevant circuitry, or it could also be materialized by incorporating all the required functionality on a single Chip or single Package (SoC—System on Chip, or SIP—system in Package). It is possible to integrate USB serialization, A2D conversion, etc. inside the ROIC (Read out Integrated Circuit) of the detector, thus achieving a one chip front end.

The external platform is an electrical device which has a computational capability, and which has an operating environment that supports USB connectivity (For example: PC, Tablet, Laptop, and SmartPhone,). The device will provide power and will communicate with the front end thru a standard USB interface (such as USB 2.0 and USB on the go "OTG").

The device OS (operating system) will have the drivers and infrastructure to easily identify the front end when connected in a "Plug and Play" mode. The BE will have development environment that will enable software developers to develop imaging application that utilize the DSD data and the SDK (which includes software Library elements).

In accordance with some embodiments, USB interface 130 may be of various forms (e.g. a "pig tail" with a connector, or a direct connector "dongle"), it needs to comply with a "Plug and Play USB" standard (mini USB, Micro USB and the like.)

According to some embodiments a Dataset 124 may be implemented by software executed on the processor of the external platform 20. A data package that include data which is specific to the particular front end device, which includes information such as NUC (Non Uniformity Correction data, and BPR (Bad Pixel Replacement) data. Dataset 124 may be generated during the manufacturing process of the front end device, and is arranged as a data package so it could be read by the BE.

According to some embodiments, a Software Kit may further be distributed with external platform: a kit which includes appropriate software elements. The code of the Kit is to be used on the BE platform. It will handle the raw data acquisition from the USB IR detector and will apply the corrections using the Dataset 124. Specifically, The Software kit may be configured to detect a one to one relationship between the Dataset 124 and front end module 120. The detection may be achieved via a device specific ID (e.g. Serial Number) that is stored on a non-volatile memory inside front end module 120, and referenced by data sets 124.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A system comprising:
   a front end module comprising:
   an Infrared radiation capturing device comprising a micro bolometer detector; and
   a universal serial bus (USB) interface connected to said Infrared radiation capturing device; and
   a backend module, comprising data sets which are specific to said micro bolometer detector and computer readable code which is executable by a computer processor located at a physical location other than the front end module,
   wherein said front end module is configured to obtain raw data from the micro bolometer detector and deliver it over said USB interface to said backend module, wherein the raw data requires processing for deriving thermal imagery data therefrom,
   wherein the backend module is configured to process said raw data using the data sets and the computer readable code, to yield thermal imagery data, and
   wherein said front end module is further configured to receive a power supply sufficient for the operation of the said front end module from a power source only via said USB interface.

2. The system according to claim 1, wherein the power source is located within a platform to which the processor is coupled.

3. The system according to claim 1, wherein the power source is located outside a platform to which the processor is coupled.

4. The system according to claim 1, wherein the data sets comprise correction dataset, usable for correcting the raw data obtained from the microbolometer detector, wherein the corrections dataset is based on a special calibration procedure used during the manufacturing of said frontend module.

5. The system according to claim 4, wherein the correction dataset comprises data relating to at least one of: bad pixels, Non Uniformity Corrections, Gain and Offset of said microbolometer detector reading.

6. The system according to claim 1, wherein the backend module further comprises a Software development kit (SDK) software module configured to enable adding processing and control operations applicable to the microbolometer detector.

7. A method comprising:
providing a front end module comprising: an Infrared radiation capturing device comprising a micro bolometer detector; and a universal serial bus (USB) interface connected to said Infrared radiation capturing device;
loading a backend module, comprising data sets which are specific to said micro bolometer detector and computer readable code onto a computer processor located at a physical location other than the front end module; and
obtaining raw data from the micro bolometer detector and delivering it over said USB interface to said backend module,
wherein the raw data requires processing for deriving thermal imagery data therefrom,
wherein the backend module is configured to process said raw data using the data sets and the computer readable code, to yield thermal imagery data, and
wherein said front end module is further configured to receive a power supply sufficient for the operation of the said front end module from a power source only via said USB interface.

8. The method according to claim 7, wherein the power source is located within a platform to which the processor is coupled.

9. The method according to claim 7, wherein the power source is located outside a platform to which the processor is coupled.

10. The method according to claim 7, wherein the data sets comprise calibration data, usable for calibrating the raw data obtained from the microbolometer detector, wherein the calibration data is based on a production profile of said microbolometer detector.

11. The method according to claim 10, wherein the production profile comprises data relating to at least one of: bad pixels, production deformations, and alignment of said microbolometer detector.

12. The method according to claim 7, wherein the backend module further comprises a standard development kit (SDK) software module configured to enable adding processing and control operations applicable to the microbolometer detector.

13. The system according to claim 1, wherein the front end module connects to a USB on the go device, using a USB cable with micro USB connectors on both cable ends.

14. The system according to claim 1, wherein the correction dataset is downloaded from the Internet during an initialization of the computer readable code, based on the specific detector serial number of the frontend module.

* * * * *